July 24, 1962
A. F. L. ANDERSON
3,045,432
FLUID COUPLING
Filed Dec. 15, 1958
2 Sheets-Sheet 1
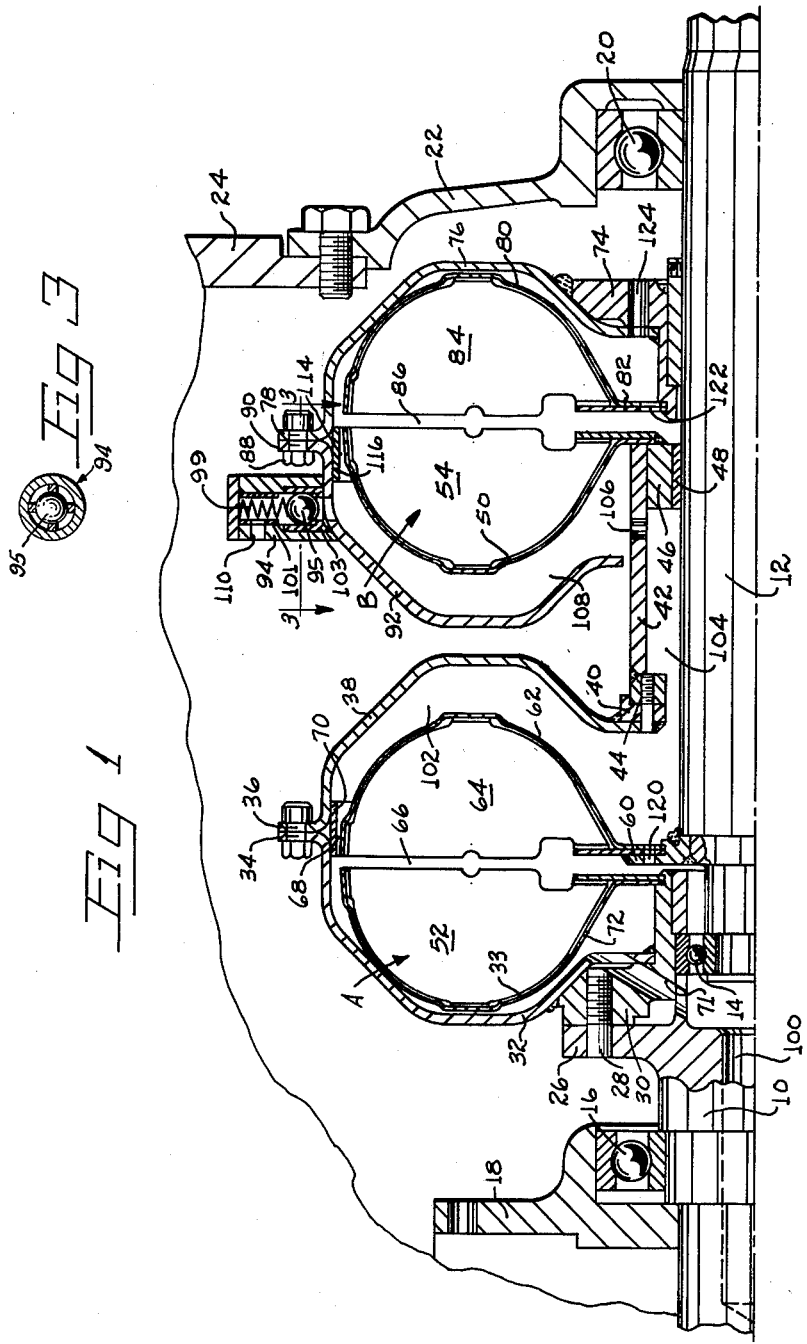
INVENTOR.
AXEL F. L. ANDERSON
BY
SMITH, WILSON, LEWIS & McRAE

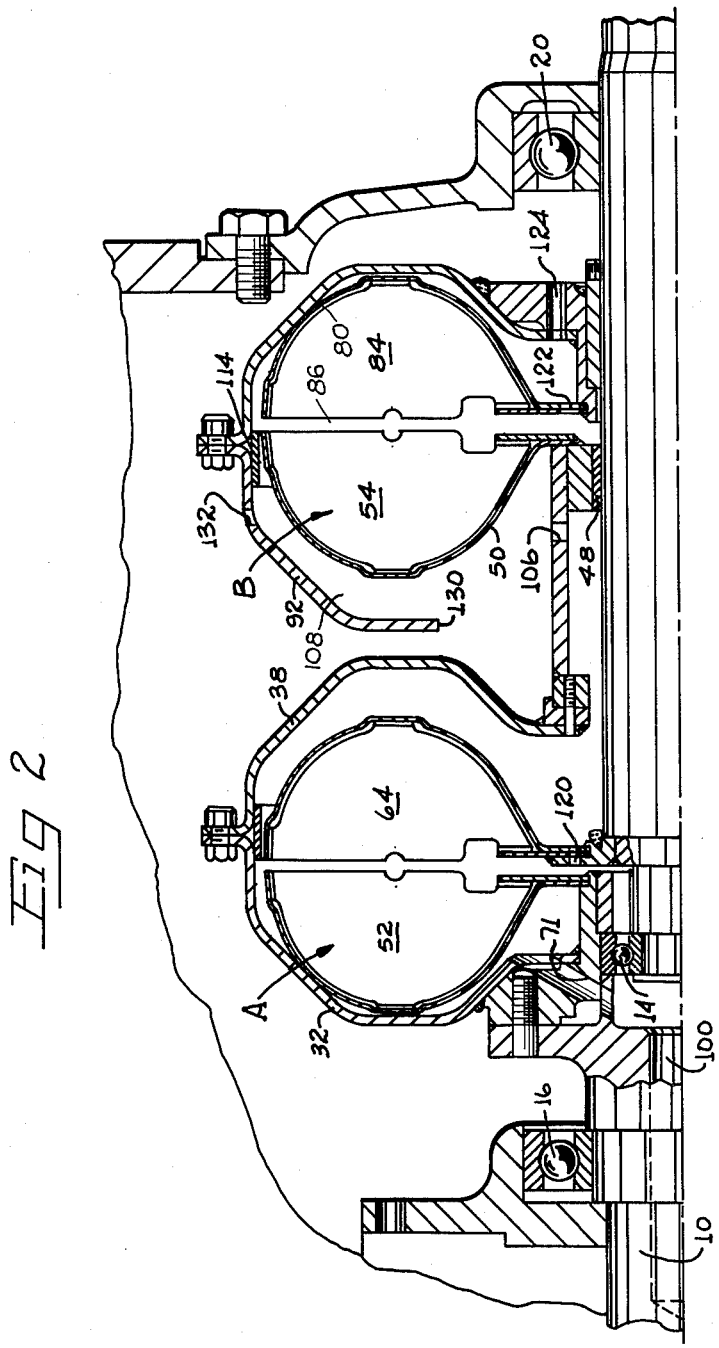

United States Patent Office 3,045,432
Patented July 24, 1962

3,045,432
FLUID COUPLING
Axel F. L. Anderson, Detroit, Mich., assignor to American Radiator & Standard Sanitary Corporation, New York, N.Y., a corporation of Delaware
Filed Dec. 15, 1958, Ser. No. 780,569
6 Claims. (Cl. 60—54)

This invention relates to fluid couplings and more particularly to a fluid coupling having a plurality of spaced successively operable units each capable of transmitting a portion of the load to be transmitted, and operable in such a manner that when an overload condition is encountered, individual units will successively be rendered inoperative thereby reducing the torque transmitted to a safe range.

Fluid couplings are interposed between driving and driven members to provide a yielding cushion drive free from vibrational impulses.

An object of my invention is to provide a fluid coupling having successively operable stages each capable of carrying a portion of the total load to be transmitted, and at least one of the stages functioning to receive its fluid from the immediately preceding stage.

A further object of my invention resides in the provision of a fluid coupling having a plurality of successively operable stages, the last stage or stages being successively rendered inoperative if an overload condition is encountered thereby protecting both the driving and driven units.

A further object is to provide a fluid coupling having a series of successively operative stages rotatable with the driven shaft and provided with a centrifugally actuated check valve to vent the fluid circuit thereof to prevent the development within the circuit of power transmitting fluid until the driven shaft attains a predetermined speed of rotation within a predetermined range of torque capacity.

Another object of my invention is to provide a fluid coupling having spaced stages wherein an initially operating unit is provided to transmit the torque up to a predetermined speed after which successively operable units are rendered operative to transmit the torque at successively higher speeds.

Other objects of this invention will appear in the following description and appended claims, reference being had to the accompanying drawings forming a part of this specification wherein like reference characters designate corresponding parts in the several views.

In the drawings:
FIG. 1 is a fragmentary longitudinal sectional view of a fluid coupling embodying my invention.
FIG. 2 is a sectional view through a second embodiment of my invention.
FIG. 3 is a fragmentary sectional view on line 3—3 in FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now more particularly to FIG. 1 of the drawings it will be noted that driving and driven shafts 10 and 12 are aligned with each other, a bearing 14 being interposed therebetween and functioning as a pilot and thrust bearing. The driving shaft 10 is supported in a bearing 16 journaled in a housing end bell 18, and the driven shaft 12 is journaled in a bearing 20 journaled in a housing end bell 22. The end bells 18 and 22 are flange connected to a housing 24 which encloses the rotating elements of the coupling and provides a sump for fluid.

The driving shaft 10 has a flange 26 secured as by cap screws 28 to an impeller hub 30 provided with an impeller casing 32 terminating in a radially extended flange 34. Hub 30 carries the impeller shell 33 having the conventional radial vanes 52, it being understood that in operation the impeller and casing 32 rotate together for causing the impeller vanes to act on the fluid within the impeller for torque-transmission purposes. Flange 34 of the casing is secured to another flange 36 of a turbine casing 38 extending radially inwardly to a bolting flange 40 engaging the end of a tubular sleeve 42 secured thereto in any convenient manner as by cap screws 44. The sleeve 42 is provided with a bearing support 46 which mounts a bearing 48 on the driven shaft 12. The outer end of the sleeve 42 supports impeller 50 which cooperates with turbine or runner 80 to define a second stage B. The first stage A of the coupling is defined by impeller 33 and turbine or runner 62 carried by shaft 12.

The driven shaft 12 is provided with a flange 60 to which the turbine shell 62 is secured in any desired manner, as by welding. The turbine shell 62 is disposed in confronting relation with respect to the impeller shell 33, and is provided with a plurality of radially extended vanes 64 positioned to operate in closely spaced axial alignment with the impeller vanes 52 of the A unit, a space 66 being interposed therebetween. It will be noted that a space 68 is provided between the outer circumference of the turbine shell 62 and the inner periphery of a shell 70 bridging the space between the impeller shell 32 and the turbine casing 38, and functioning to provide a desired degree of reinforced alignment therebetween. Fluid may be introduced into the coupling A in any desired manner through radially extended passages 71 in the impeller hub 30 to flow through spaced apertures 72 in the impeller shell 33 of the A unit.

Driven shaft 12 is provided with a turbine casing hub 74 to which is secured in any desired manner, as by welding, the turbine casing 76 terminating in a radially extended flange 78. It will be noted that turbine shell 80 is secured in any convenient manner in the turbine casing 76 and has a radially inwardly extended flange 82 secured to the hub 74. The turbine shell 80 is provided with radially extended vanes 84 aligned with the vanes 54 of the impeller 50, a space 86 being interposed between the impeller and turbine vanes of the B unit.

The flange 78 of the turbine casing 76 is secured as by bolts 88 to a flange 90 of an impeller casing 92 extending radially inwardly and enveloping the impeller shell 50 of the B unit. Two centrifugally actuated valve assemblies 94 are secured to the impeller casing 92, each of said valve assemblies comprising a spherical valve element 95 urged away from valve seat 101 by a compression spring 99. Element 95 is movably carried within an insert 103 having suitable slots therein for passage of fluid toward seat 101.

It will be noted that the driving and driven shafts 10 and 12 are maintained in accurate alignment relative to each other by means of the bearings 14, 16, 20 and 48, and that the impellers of the units A and B are maintained in accurate alignment by means of the bearings 14 and 48, the bearings 20 and 14 maintaining the turbine units of the A and B units in accurate alignment.

In the operation of my improved fluid coupling, fluid enters the hollow interior 100 of the driving shaft 10 and flows outwardly through the radially extended passages 70 in the hub 30 through the apertures 72 into the space within the impeller shell 33 between vanes 52 thereof. The rotating impeller energizes the fluid and throws it radially outwardly, the shell 33 deflecting the fluid circumferentially to flow into the turbine shell 62 of the A unit, whereupon the circulating fluid impinges on the vanes 64 of the turbine to impart torque to the driven shaft 12. A portion of the fluid directed by the impeller flows through the circumferential space 68 between the outer periphery of the turbine shell 62 and the reinforcing shell 70, to the space 102 between the turbine casing 38 and the turbine shell 62. Torque is thus transmitted to the driven shaft to drive the load at reduced speed. The fluid flows radially inwardly in the space 102 and flows axially through a space 104 between the sleeve 42 and the driven shaft 12 to a series of radially disposed apertures 106 in the sleeve 42 beyond the impeller casing 92. Fluid then flows radially outwardly through the space 108 between the impeller casing 92 and the impeller shell 50 of the B unit to the check valve assembly 94 where it is discharged through the apertures 110 into the space 112 within the enclosing casing 24. As the speed of the driven shaft increases to a predetermined speed the centrifugal force acting on the valve element 95 shifts the valve element outwardly to engage the seat 101 thereby preventing the escape of fluid from the B unit. Fluid then flows axially through a circumferential space 114 between the outer periphery of the impeller shell 50 and a reinforcing sleeve 116 bridging the space between the impeller casing 92 and the turbine casing 76 into the fluid circuit of the B unit. As the B unit fills with fluid, torque is transmitted thereby to drive the driven shaft at higher speed.

It will be noted that when an excessive load is exerted on the driven shaft 12 it will slow down whereupon the check valve 94 will function to vent the fluid circuit of the B unit thereby relieving the overload torque and thereby removing the torque-transmitting force exerted by the B unit to prevent damage caused by overloading both the driving and driven units.

At starting speeds the load is carried by stage A, with stage B uncoupled. Thus, at low speeds vent openings 110 carry off the power fluid to prevent it from filling the vanes in stage B. As the output shaft speed increases valve element 95 closes under centrifugal force so that stage B is filled to transmit a portion of the torque to the output shaft.

Excessive load on the output shaft causes it to decelerate, with consequent opening of valve element 95 when the spring 99 overcomes centrifugal force exerted on the valve element 95 and uncoupling of stage B. It will thus be noted that torque limitation is provided both at starting speeds and under steady run conditions. Air vent openings are provided at 120, 122 and 124 to insure quick filling of the various vanes without back pressure resistance, the operation of the unit being such that quick response to overload conditions is attained while maintaining a substantially constant output speed under steady run operation.

FIG. 2 illustrates another embodiment of the invention wherein torque limitation is provided by forming an annular opening 130 in impeller casing 92 and disposing two diametrically spaced leak nozzles 132 in said casing.

In operation of the FIGURE 2 embodiment, fluid discharged into space 108 through the apertures 106 is restricted in its entry through the circumferential passage 114 into the working chamber formed by impeller shell 50, impeller vanes 54, runner shell 80, runner vanes 84 and radial gap 86 between the runner vanes and impeller vanes, by relatively large differences in speed between the two rotating elements. This is effected by virtue of the fact that when the impeller 50 and the runner 80 are operating at relatively large differences in speed, a rapid circulation of fluid occurs within the working chamber formed by impeller 50, runner 80 and gap 86. This rapid circulation has the effect of substantially emptying the fluid from the impeller 50, and partially emptying the fluid from the runner 80 through the gap 86 and circumferential passage 114 into the space 108.

On the other hand, when both the impeller and runner are operating at substantially the same speed, there is little circulation of oil in the working chamber itself. Under this condition there will be little tendency for the unit to pump itself empty. Thus, under steady running conditions at normal load there is a relatively small difference in speed of the rotating elements, the circulation within the working chamber is relatively low and the working chamber will readily fill through passage 108 and gap 114 and will remain operably filled and thus be capable of efficient power and torque transmission.

When the output shaft is running up to speed and an overload condition occurs, the output shaft decelerates and the resulting difference in speed between impeller and runner causes the rapid fluid circulation previously described, causing fluid to be ejected from the working chamber through the circumferential passage 114 into space 108 and then through the annular opening 130. Thus the working chamber will empty and substantially declutch itself.

The first stage fluid drive consisting of impeller 52, runner 64 and enclosures 32 and 38 will continue to transmit a predetermined minimum torque after the second stage has substantially declutched.

The amount of fluid in the working chamber in the FIGURE 2 embodiment for transmitting torque is dependent on the amount of fluid contained in surrounding space 108. If annular opening 130 is increased in size, the space 108 will contain less fluid and the unit will be capable of transmitting less torque than would be possible if apertures 130 were smaller and the contents of space 108 thereby greater with a resulting greater fluid content in the working chamber.

The leak nozzles 132 serve as a means of eliminating heated oil from the working chamber and space 108, and also as a means of completely emptying stage B of fluid when the unit is declutched by shutting off the supply of fluid thereto through the apertures 106. However, under normal running conditions, the amount of fluid entering the unit through the apertures 106 exceeds that which may be exhausted through the leak nozzles 132 to provide operability of the work chamber B.

Both embodiments of the invention provide two stage coupling of the input shaft with the output shaft, with one stage being automatically uncoupled in the event of overload conditions.

I claim:

1. The combination comprising a housing having a pair of opposed end walls; an input shaft having a relatively short portion thereof extending within the housing; an output shaft axially aligned with the input shaft and having a relatively long portion thereof extending within the housing; first bearing means between adjacent end portions of said shafts; a first impeller carried by the input shaft; a first runner carried by the output shaft in opposing relation to the impeller for cooperating therewith in defining a first toroidal work chamber with a first radial gap between said impeller and runner defining said first work chamber; means for continuously supplying fluid to said first work chamber; a first casing element connected with said first impeller and surrounding the first runner to define a first chamber for receiving fluid from the first work chamber; open fluid communication between the outer portion of said first radial gap and said first chamber; a tubular conduit surrounding a portion of the output shaft and connected with said first casing element to receive fluid therefrom; second bearing means between said tubular conduit and said output shaft; a second impeller connected with said tubular conduit; a second runner connected with the output shaft in opposing relation to the second impeller for coperating therewith in defining a second toroidal work chamber with a second radial gap between said second impeller and said second runner defining said second work chamber; a second casing element connected with said output shaft and surrounding the second impeller to define a second chamber for conveying fluid from said tubular conduit around an outer surface of said second impeller into the second work chamber; open fluid communication between the outer portion of said second radial gap and said second chamber; fluid passage means between said tubular conduit and said second casing element; and an overflow exhaust passage from said second work chamber.

2. The combination comprising an input shaft; an output shaft aligned with said input shaft, first bearing means between the opposed end portions of said shafts; a first impeller carried on said input shaft; a first runner carried on said output shaft and opposing said impeller to cooperate therewith in defining a first toroidal work chamber with a first radial gap between said impeller and runner defining said first work chamber; means for continuously supplying fluid to said first work chamber; a first casing element connected with said impeller and surrounding the first runner to define a first chamber to receive fluid from the first work chamber; open fluid communication between the outer portion of said first radial gap and said first chamber; a tubular conduit extending from said casing element along a portion of said output shaft and having openings therein for passage of fluid; second bearing means between said tubular conduit and said output shaft; a second impeller connected with said tubular conduit; a second runner connected with said output shaft in a position opposed to the second impeller for cooperating therewith in defining a second toroidal work chamber with a second radial gap between said second impeller and second runner defining said second work chamber; a second casing element connected with the second runner and extending at least partially around the second impeller to define a second chamber for receiving fluid discharged through the aforementioned openings and conveying said fluid around the outer surface of said second impeller and into the second work chamber; open fluid communication between the outer portion of said second radial gap and said second chamber; fluid passage means between said tubular conduit and said second casing element; and an overflow exhaust passage from said second work chamber.

3. The combination of claim 2 and further comprising at least one centrifugally-operated valve structure carried on a portion of the second casing element and operable at relatively low speeds thereof to exhaust fluid out of the second casing element.

4. The combination of claim 2 wherein the second casing element has a free inner edge area terminating a substantial distance from the tubular conduit so as to define an enlarged eye structure.

5. A fluid coupling comprising an input shaft; an output shaft in axial alignment with said input shaft; a first impeller connected with the input shaft; a first runner carried on the output shaft in opposing relation to the impeller to cooperate therewith in defining a first toroidal work chamber with a first radial gap between said impeller and runner defining said first work chamber; means for continuously supplying liquid to the first work chamber; a first casing element connected with the impeller and surrounding the first runner to define a chamber to receive fluid from the first work chamber; open fluid communication between the outer portion of said first radial gap and said first chamber; a second impeller; a drive connection between said second impeller and said first impeller; a second runner connected with the output shaft in opposing relation to the second impeller to cooperate therewith in defining a second toroidal work chamber with a second radial gap between said second impeller and second runner defining said second work chamber; a second casing element connected with the second runner and extending at least partially around the second impeller; and conduit means connecting the first casing element with the second impeller so that fluid which is discharged from the first casing element is enabled to flow around the outer surface of said second impeller and into the second work chamber via the second casing element, and an overflow exhaust passage from said second work chamber.

6. In a fluid coupling, a rotatable input shaft, a rotatable output shaft in coaxial alignment with said input shaft, a first impeller connected to said input shaft, a first runner connected to said output shaft and opposing said first impeller to define a first toroidal work chamber with a radial gap between said first impeller and said first runner defining said first toroidal work chamber, means for continuously supplying fluid to said first work chamber, a second impeller journaled on said output shaft, a second runner connected to said output shaft and opposing said second impeller to define a second toroidal work chamber with a radial gap between said second impeller and said second runner defining said second toroidal work chamber, a first casing connected to said first impeller and surrounding said first runner in open fluid communication with said radial gap of said first toroidal work chamber, a second casing connected to said second runner and surrounding said second impeller in open fluid communication with said radial gap of said second toroidal work chamber, conduit means connected between said first casing and said second impeller and surrounding a portion of said output shaft and connecting said first and second impellers in driving relation, fluid passage means between said conduit and said second casing, means operable to drain fluid from said second work chamber and render said second work chamber inoperable at low speeds of said second runner, and overflow exhaust passage means from said second toroidal work chamber, whereby fluid continuously admitted to said first toroidal work chamber passes into said second toroidal work chamber to render the second work chamber operable and coupled with said first work chamber at high rotational speeds of said output shaft and is exhausted from said second work chamber to render the second work chamber inoperable and uncoupled from said first work chamber at low rotational speeds of said output shaft.

References Cited in the file of this patent
UNITED STATES PATENTS

| | | |
|---|---|---|
| 2,194,949 | Lysholm | Mar. 26, 1940 |
| 2,256,878 | Black | Sept. 23, 1941 |
| 2,341,624 | Kieser | Feb. 15, 1944 |
| 2,488,478 | Roberts | Nov. 15, 1949 |
| 2,880,583 | Sinclair | Apr. 7, 1951 |
| 2,917,899 | Kollmann et al. | Dec. 22, 1959 |